United States Patent [19]
Goldrian

[11] Patent Number: 6,002,883
[45] Date of Patent: Dec. 14, 1999

[54] SYSTEM WITH INTERSYSTEM INFORMATION LINKS FOR INTERSYSTEM TRAFFIC HAVING I/O TRAFFIC BEING TRANSMITTED TO AND FROM PROCESSOR BUS VIA PROCESSOR MEANS

[75] Inventor: Gottfried Andreas Goldrian, Boeblingen, Germany

[73] Assignee: International Business Machines Corporation, Armonk, N.Y.

[21] Appl. No.: 08/696,547

[22] Filed: Aug. 14, 1996

[30] Foreign Application Priority Data

Jul. 18, 1996 [EP] European Pat. Off. ............... 96111589

[51] Int. Cl.[6] .............................. G06F 13/00; G06F 12/08
[52] U.S. Cl. ...................... 395/856; 395/287; 395/685; 395/840; 395/800.32; 711/118
[58] Field of Search ..................................... 395/821, 287, 395/685, 446, 449, 311, 500, 800.32, 840, 856; 711/118, 130

[56] References Cited

U.S. PATENT DOCUMENTS

| | | | |
|---|---|---|---|
| 5,014,236 | 5/1991 | Pogorzelski et al. | 364/900 |
| 5,241,631 | 8/1993 | Smith et al. | 395/325 |
| 5,309,568 | 5/1994 | Ghosh et al. | 395/325 |
| 5,426,737 | 6/1995 | Jacobs | 395/275 |
| 5,485,585 | 1/1996 | Huynh et al. | 395/311 |
| 5,557,769 | 9/1996 | Bailey et al. | 395/473 |

*Primary Examiner*—Thomas C. Lee
*Assistant Examiner*—Rehana Perveen
*Attorney, Agent, or Firm*—Lynn L. Augspurger

[57] ABSTRACT

The exchange of commands and data between I/O devices, such as DASDs, and a computer system, preferrably a multiprocessor computer system, usually takes place via I/O adapters. The question arises of how to couple these I/O adapters to the computer system. In prior art solutions, the I/O adapters were either attached to the second level cache or to a memory bus. The present invention relates to a method of coupling the stream of I/O commands and I/O data to the computer system via the processor busses. Because of the high bandwidth of the processor busses, an additional transmission of I/O data does not disturb regular data traffic on the processor bus. One advantage of using the processor busses for the transmission of I/O data is that pins of the second level cache chips don't have to be used for the attachment of I/O adapters any more and thus become available for other purposes. For example, the bandwidths of processor busses or memory busses can be increased, or additional processor busses can be accomodated.

8 Claims, 8 Drawing Sheets

SYSTEM WITH INTERSYSTEM INFORMATION LINKS FOR INTERSYSTEM TRAFFIC HAVING I/O TRAFFIC BEING TRANSMITTED TO AND FROM PROCESSOR BUS VIA PROCESSOR MEANS

FIELD OF THE INVENTION

The present invention relates to a method of coupling I/O traffic to a computer system, especially to a multiprocessor computer system.

BACKGROUND OF THE INVENTION

A typical multiprocessor computer system comprises several processors, cache memories of different hierarchy levels, storage controlling devices, a main memory, and means that control data exchange with I/O devices.

When describing the different memory levels the processors address, one has to start with the first level cache. Each processor has its own, individually assigned first level cache integrated on-chip. Therefore, the wiring delay is small for read and write operations to this cache and the latency is low, which means that a very fast access to the data and instructions stored in the first level cache is possible.

The next level in the hierarchy of cache storage means is the second level cache. The task of this cache is to provide data exchange with the first level cache. The storage size of the second level cache is much greater than that of the first level cache, and usually, the second level cache is not integrated on the processor chip, but placed on a dedicated chip (or set of chips). Therefore, the latency for a second level cache access is not as low as for the first level cache.

There exist several concepts for the realization of a second level cache structure in a multiprocessor computer system.

One of these concepts is to assign an individual second level cache to each processor, which means that each processor can only address the data in its personal cache. Therefore, each of these "dedicated caches" holds exactly the data units requested by its processor; and of course, two of these caches usually hold different data units.

Let us suppose that processor 1 writes to a cache line contained in its second level cache, and that a copy of said line is also contained in a second level cache owned by a different processor, e.g. by processor 3. In the moment the write access to cache 1 occurs, the page in cache 3 is not valid any more. Therefore, a mechanism has to exist (the so-called switching-and-snooping network) that signals to cache 3 that the data of a certain line has become invalid, in order to maintain data integrity.

The necessity of keeping track of different versions of one and the same cache line in the second level cache falls away when a shared cache structure is realized. "Shared" means that each processor addresses the same second level cache storage space. The accessible lines that have been copied to and that are now contained in the second level cache are the same for all processors.

This also implies that a shared second level cache built in order to have a performance similar to that of individually assigned second level caches has to have an absolute storage size that is several times the size of one of said individual caches. When realizing said shared cache concept, one usually employs several second level cache chips in parallel.

Between second level cache and processors, data is transferred via so-called processor busses. As a certain line that a processor wants to address can be stored on any of the second level cache chips, each second level cache chip has to be connected to each of the processors of the multiprocessor system via one of said processor busses. In order to take advantage of a low latency of the second level cache, each processor bus has to be capable of high-speed data transmission and provide a high-bandwidth communication link. Usually, regular instruction and data flow on the processor bus, from the second level cache to the processor, and vice versa, only requires about 20% of the maximum data transfer rate possible on said processor bus.

All the devices described so far, the processors and the second level cache chips, may be mounted on one multi-chip module. This module exchanges data via memory busses with a main memory, consisting of at least one memory card. Each memory card comprises a storage controller, which also provides the clocking system for the whole memory card, and several memory banks.

When a processor requests data which is not accessible in the second level cache yet, lines have to be transferred from a memory bank of the main memory to the second level cache. On the other hand, cache lines that have been modified in the second level cache have to be rewritten to the main memory in order to ensure data integrity.

Data exchanged between the computer system on the one hand and external devices, such as discs, tapes, etc. on the other hand is generally referred to as I/O-traffic. Usually, I/O devices are coupled to an I/O adapter, which is connected to the computer system via the second level cache. One or two of the processors of the multiprocessor system, the so-called service assist processors (SAPs), are especially responsible for handling data exchange between the I/O devices and the main memory.

In a multiprocessor system, each of the second level cache chips has to accomodate processor busses connecting said second level cache chip to each of the processors, memory busses linking said cache chip to a memory card, and additional data links for exchanging data with I/O devices. All these connections require a lot of the second level cache chip's pins.

Usually, a chip has a side length of 14.5 or 16 mm. The lower side of the chip bears an array of blobs of solder, in order to connect the chip to the ceramic substrate, the multi-chip module. For a typical chip, the number of soldering tags is 1240. One would be tempted to increase the number of pins by simply increasing the chip size. When soldering the chip to the substrate according to the "flip chip technique" (described, for example, in L. F. Miller's article "Controlled Collapse Reflow Chip Joining", IBM J. Res. Develop., May 1969, p. 239–250), und thus heating up both the chip and the substrate, shear strains arise because of the different coefficients of expansion of chip and substrate. The occurence of these shear strains imposes physical limits to the increase in chip size and to the increase in pin count.

Therefore, pins are valuable, and any method that contributes to saving pins, especially pins of a second level cache chip, permits a better layout and improved performance.

One method for saving pins is the introduction of switching means. For example, both a memory bus and a data link to an I/O adapter can be coupled to a switching network which, for its part, is connected to a second level cache chip. Thus, the memory bus and the I/O data link share the same cache chip pins, and therefore, a lot of the pins that formerly were necessary to accomodate both the memory bus and the I/O data link become available. Of course, one does not have to switch between a memory bus and an I/O data link, one could as well switch between links to different I/O devices, or, in case a multiprocessor system with a clustered shared second level cache is realized, between connections to different clusters.

The introduction of switches has several disadvantages, though. For example, let us consider the case that both an I/O data link and a memory bus are connected via a switch to a second level cache chip. When data traffic occurs on both the I/O data link and the memory bus, the switch can only permit access to the second level cache to one of them, which means that the other one can't exchange data with the cache at that time and has to wait for several cycles. Furtheron, the implementation of additional switches requires additional chips. Increasing the number of chips always means that packaging becomes more difficult and that the wiring delay of certain signals increases. The main disadvantage of the use of switches is therefore the occurence of additional delays which severely degrade system performance.

So far, reference has only been made to a single multiprocessor system. In order to further increase system performance, concepts of parallel computing have been realized where several of said multiprocessor systems are connected. Each of these multiprocessor systems still addresses its individual memory, but there also exists a central shared memory which every multiprocessor system can address. The storage size of this central memory is much larger than the size of the memories individually assigned to each multiprocessor system. For each data structure (list, cache, lock structure) contained in said central memory, ownerships are defined which enable or disable access of a certain multiprocessor system to said data structure. One of the multiprocessor systems, the so-called coupling facility, is dedicated to managing both the communication/ synchronization between the different multiprocessor systems and the access (and access rights) of the multiprocessor systems to the central memory which is attached to said coupling facility. This implies that all data that one of the multiprocessor systems fetches from or stores to the central memory has to be exchanged between said multiprocessor system and the coupling facility. Thus, strong data links have to exist between the systems and the coupling facility, and the bandwidth required for these links in order to permit quick access of all multiprocessor systems to the central memory is much higher than the bandwidth required for the transmission of conventional I/O traffic between a computer system and its external devices. Therefore, with respect to a coupling facility, the question arises of how to connect such an additional intersystem communication link to the computer system.

Again, one solution is the introduction of switching means in order to couple said intersystem communication link to the second level cache. With this method, it is possible to accomodate the link and still meet pin count requirements. Because of the additional wait cycles caused by switching means, the latency of an access to the computer system is increased. Thus, the introduction of switching means might be a correct concept for a coupling facility of today, but for future parallel systems, latency will have to be much lower.

OBJECT OF THE INVENTION

The object of the present invention is therefore to provide means for coupling external data traffic to a multiprocessor computer system without affecting the availability of pins belonging to chips of the second level cache.

Another object of the invention is to provide means for coupling external data traffic to a multiprocessor computer system that permit a low latency access to said computer system. It is important that additional delays are avoided when data is transferred to and from said computer system.

A further object of the invention is to provide means for coupling external data traffic to a multiprocessor computer system that are able to handle high-bandwidth data links.

Such high-bandwidth communication links are required when connecting a number of multiprocessor computer systems to a central coupling facility. A further object of the invention is therefore to provide means for connecting high-bandwidth intersystem communication links to a coupling facility and to give a concept for efficient intersystem communication, which is a prerequisite for high performance parallel computing.

SUMMARY OF THE INVENTION

The underlying concept of the invention is to use the processor bus for the transmission of I/O data (or, more generally, any kind of external data) to the second level cache. The bandwidth of the processor bus is so large that only about 20% of this bandwidth are actually used for data transmission between processor and second level cache. The bandwidth required for the transmission of I/O data is much smaller than the bandwidth necessary for data exchange between second level cache and processor. In a typical multiprocessor computer system, it amounts to about 1% of the bandwidth of the processor bus. Therefore, it is possible, by means of an adequately designed bus protocol, to transmit both the data traffic between processor and second level cache and the I/O traffic via the same processor bus. Because of said high bandwidth of the processor bus, the additional transmission of I/O data does not obstruct the regular data traffic between processor and second level cache.

One advantage of coupling I/O traffic to a multiprocessor computer system via the processor bus is that no extra pins of the second level cache have to be used anymore. As pin count restrictions are especially critical for the second level cache chips, the solution provided by this invention contributes to pin economy.

The pins saved in this way can be used for other tasks, for example for connecting more processors to the second level cache, or for increasing the bandwidth of the existing links between the processors and the second level cache. In any case, these extra pins permit a performance increase of the multiprocessor computer system, and they allow for more flexibility when designing a new computer system because pin count restrictions don't impose that severe limits any more.

There are several ways how the invention can be implemented. One can connect an I/O adapter to a processor in order to transfer I/O data via the processor bus to the second level cache. The advantage of connecting I/O adapters directly to the processor is that no extra chips are required, which would also slow down data transfer. Usually, the availability of a processor chip's pins is not a problem, because a processor does not have to host that many data links. The processor determines when to use the processor bus for the transmission of regular data traffic between second level cache and processor, and when to transmit I/O data.

A second way the invention can be used is to introduce switching means to the processor bus. A multiplexing technique allows to alternatively transmit processor-cache-traffic or I/O traffic via the processor bus. This solution might be favorable when, for some reason, the processor's pins are not to be accessed.

Alternatively, when the processor bus is realized in tristate logic comprising a high impedance state, the I/O adapter can be directly connected to the processor bus. Either the processor or the I/O adapter can switch to the inactive high impedance state in order not to interfere with a data transmission. An advantage of this solution is that no extra chips are required.

The rate at which I/O traffic can be transmitted via a processor bus might differ from the rate at which I/O traffic from the external device arrives at the I/O adapters. Therefore, it might be advantageous to introduce a first in-first out buffer, a so-called speed matching buffer, between I/O adapter and processor bus which can store incoming I/O data and which transmits said data at a different rate to the processor bus, thus matching transmission speed.

Further advantages arise with regard to a second level cache realized as a shared or clustered shared cache structure. In a shared cache structure, the different cache chips have to be connected with data links, and these links use pins of the second level cache chips. In order to accommodate all these links, connect a lot of processors to the second level cache, and connect the memory busses to the cache, an implementation of the invention provides the necessary pins for these tasks: Shared cache concepts can be realized while there remain many pins that can be used for connecting processors to the cache. Thus, improved computer design becomes possible.

Especially with regard to a coupling facility, an implementation of the invention provides advantages. While I/O traffic in a regular multiprocessor computer system only amounts to about 1% of a typical processor bus' bandwidth, data traffic between a coupling facility and the external multiprocessor computer systems attached to that coupling facility occupies up to 10% of said processor bus' bandwidth. On the other hand, in a coupling facility, the data traffic between cache and processor only amounts to about half of that of a regular multiprocessor system.

According to the invention, this comparatively big data traffic, which would be difficult to couple to the coupling facility's second level cache, can be fed to the coupling facility via the processor busses. Data transfer between said coupling facility and an external multiprocessor system is much faster this way than when attempting to feed the external data traffic to the coupling facility via a switch. Therefore, the invention provides an efficient method for the interconnection of multiprocessor computer systems to a big cluster and thus contributes a key feature to the further development of parallel computing.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1A:
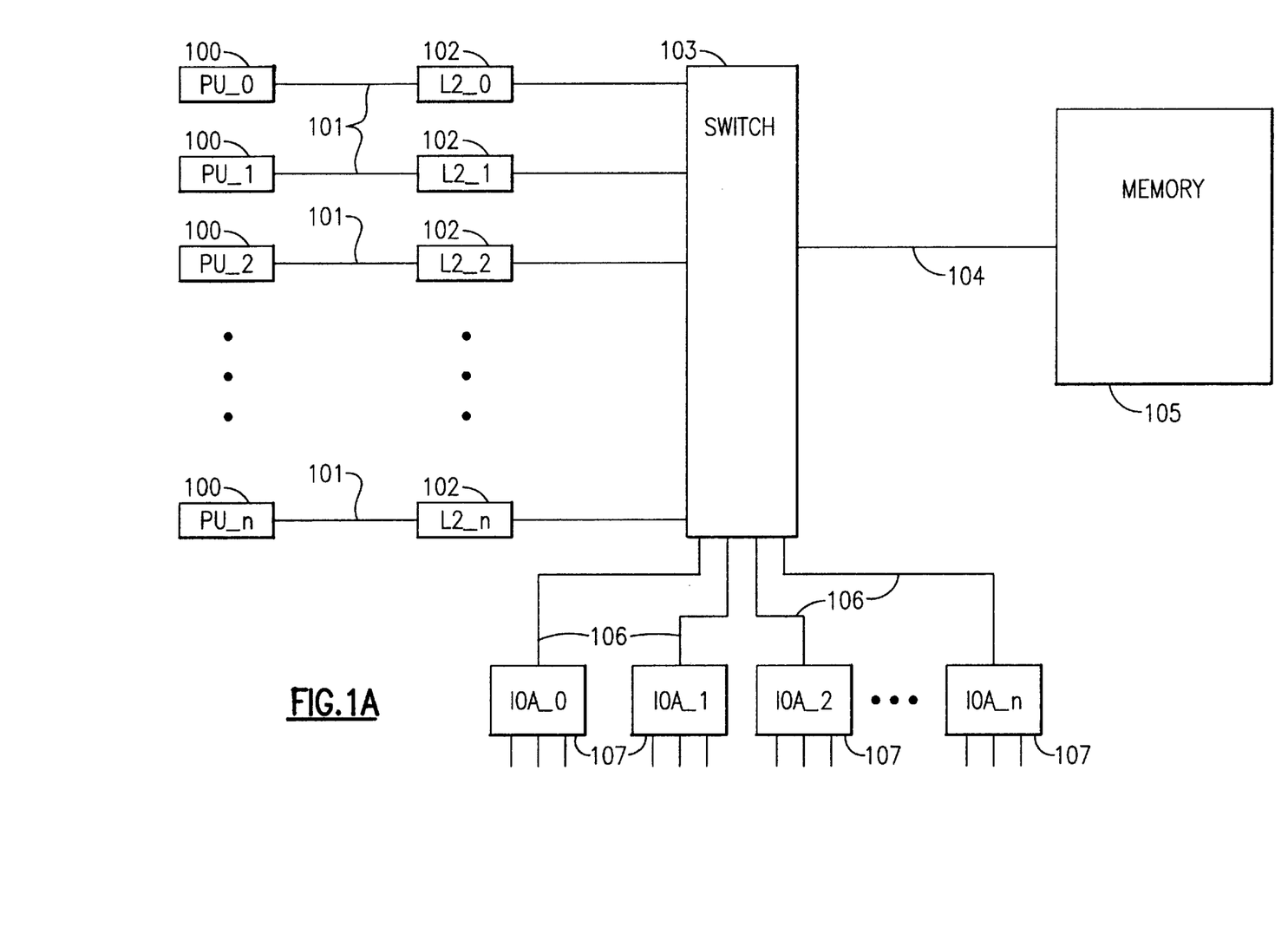
FIG. 1A is a block diagramm that shows a multiprocessor computer system with dedicated caches, including switching means.
Figure 1B:
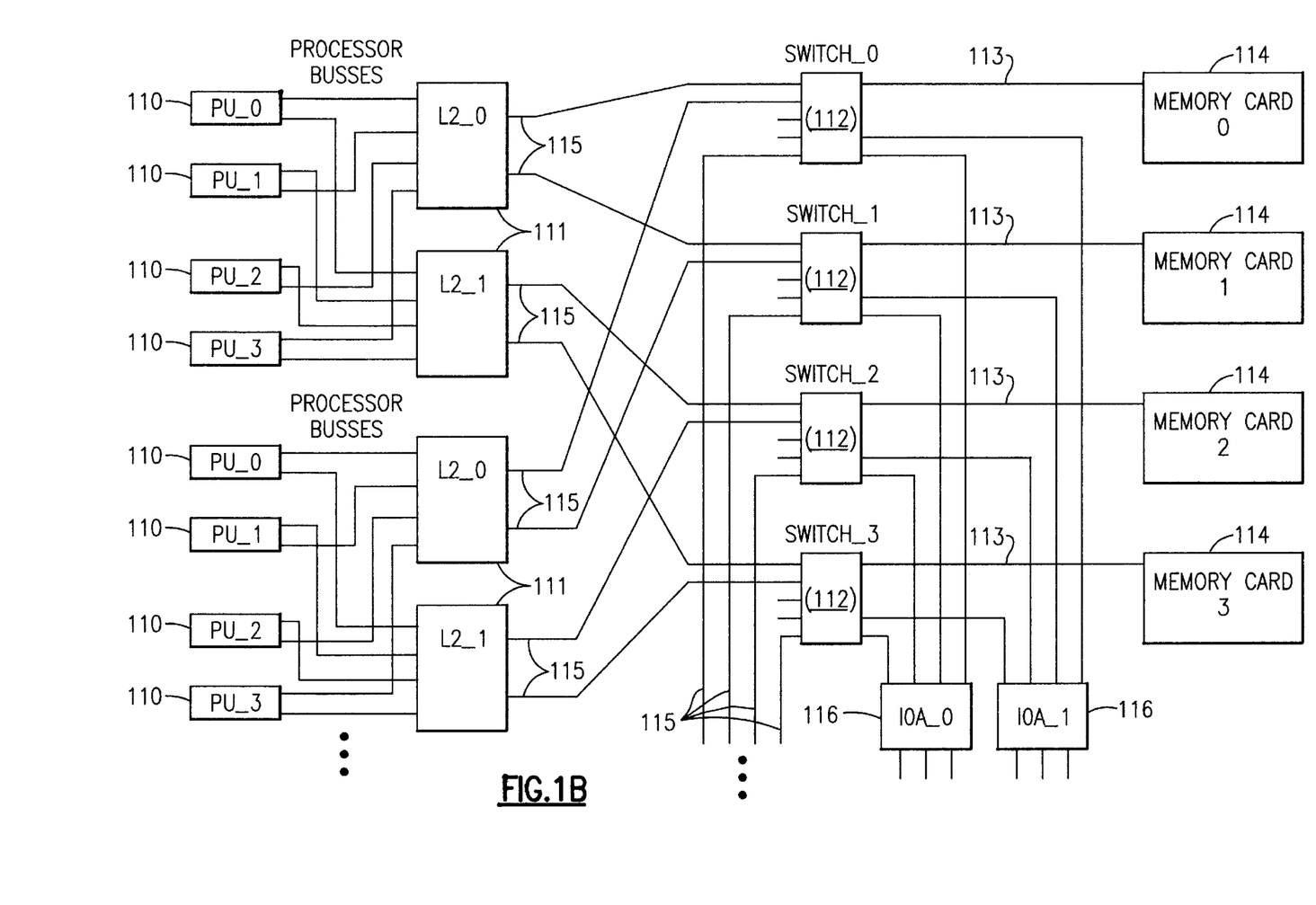
FIG. 1B is a block diagram that shows how switching means can be introduced to a multiprocessor computer system with a clustered shared cache.

In FIG. 1A and 1B, solutions of the prior art are shown which overcome the problem of pincount restrictions by the introduction of switching means. In FIG. 1A, a multiprocessor computer system with individually assigned second level caches is shown.

The processors (100) are connected via processor busses (101) to the second level cache chips (102), and there exist data links between said second level cache chips and switching means (103). The main memory (105) is also connected via a memory bus (104) to said switching means, and so are the I/O adapters (107). The switch solves the problem of accomodating both the memory bus (104) and the data links (106) for I/O traffic at the second level cache. If a processor stores data to or fetches data from either the memory or an I/O device, the read or write access is performed via said switching means.

A further example of a prior art solution is given in FIG. 1B. There, a clustered shared cache structure is realized, which means that all the processors of one cluster share a common cache assigned to said cluster. Each of the processors (110) of one cluster has to be connected via processor busses to each of the cluster's second level cache chips (111), in order to have access to all the data contained in said cache. It is obvious from FIG. 1B that the second level cache chips already have to host a lot of data links, and therefore, memory and I/O devices have to be coupled to each cluster via switching means. Each memory card (114) ist connected via a memory bus (113) to one of the switches (112), and said switch also accomodates links to the I/O adapters (116). Each switch (112) has data links (115) to at least one second level cache chip of each cluster, in order to permit access of said processor cluster to all memory cards and I/O devices.

Figure 2A:
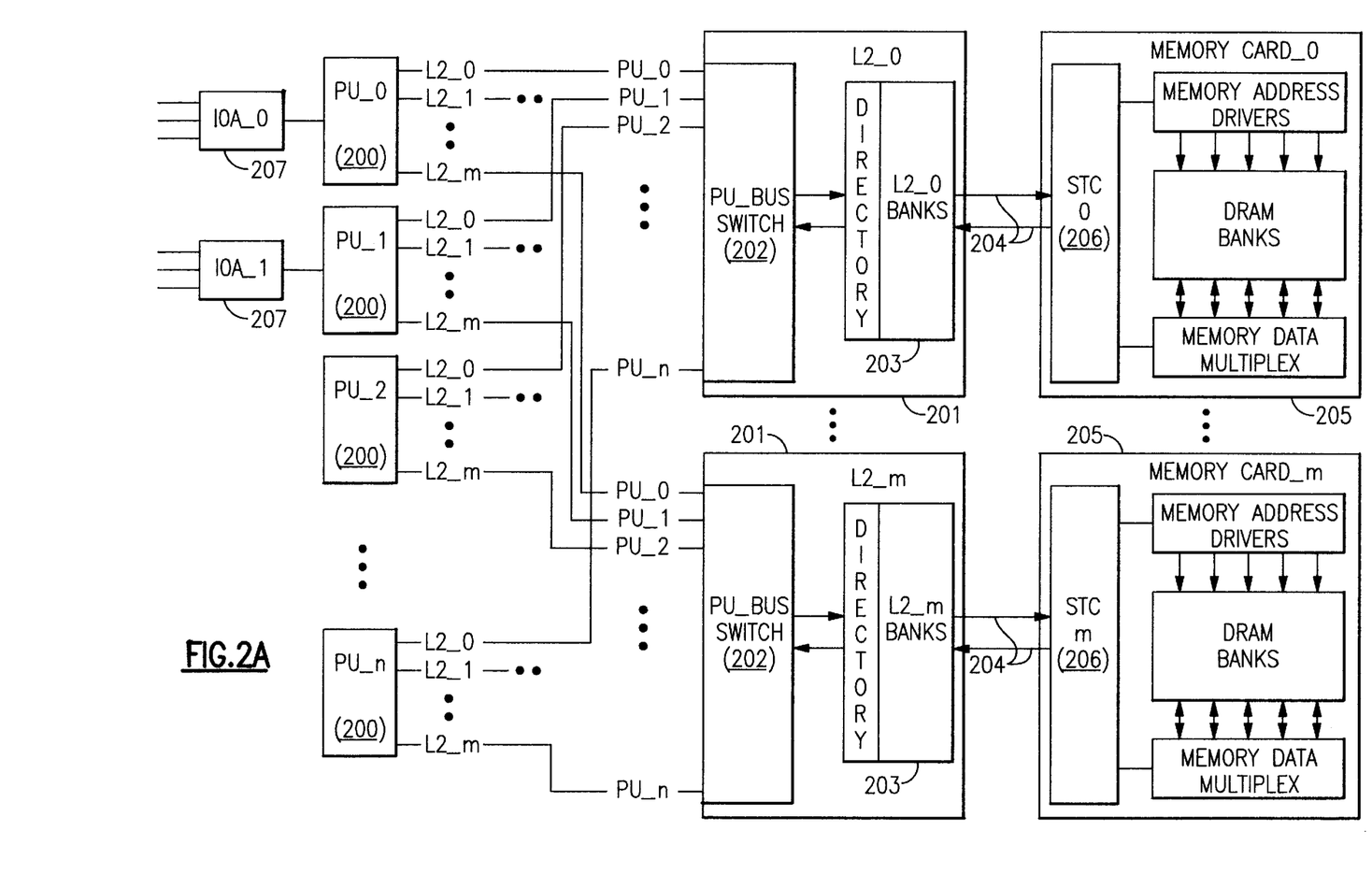
FIG. 2A is a block diagram of a multiprocessor system, the cache structure being a fully shared cache, with the I/O adapters attached to the processors.

According to the invention, instead of utilizing switching means, such as in FIG. 1A and 1B, I/O traffic is fed to the second level cache via processor bus means. FIG. 2A shows an example of a multiprocessor computer system with a shared cache structure, where the invention has been implemented. Each of the processors (200) is connected via a processor bus to each of the second level cache chips (201). A second level cache chip contains memory banks (203) which store the cache lines contained in said cache, a directory that keeps track of the location of the different cache lines, and a processor bus switch (202) that is responsible for connecting the correct memory bank to the processor bus. Each second level cache chip (201) is connected via a memory bus (204) to a memory card (205), comprising a storage controller (206) that controls access to the different DRAM banks, memory address drivers, a key storage and memory data multiplexing means. In order to couple I/O traffic via the processor and the processor bus to the computer system, I/O adapters (207) are attached to some of the processors (200). Though each processor has to accomodate processor busses linking said processor to each of the second level cache chips, there are usually enough processor pins available to host said I/O adapters. External devices can be coupled to the I/O adapter via busses, with the I/O adapters also being responsible for data format conversion of the incoming data.

Figure 2B:
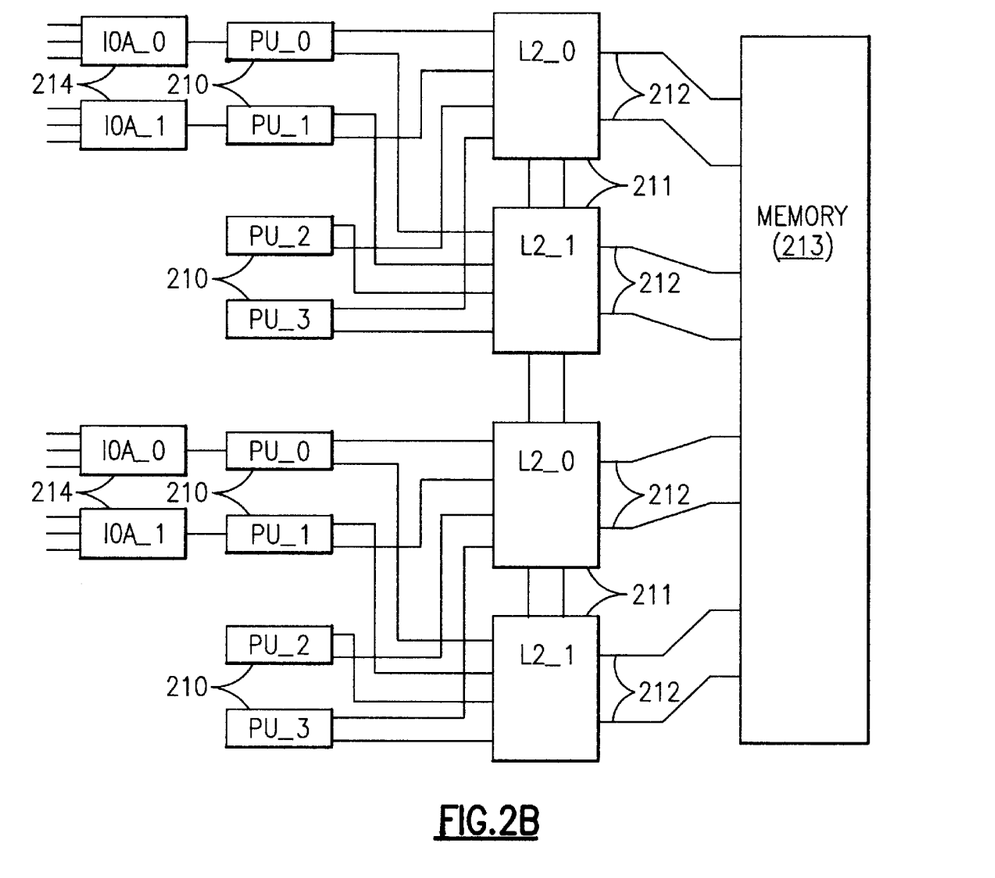
FIG. 2B is a block diagram of a multiprocessor system with a clustered shared cache, the I/O adapters being connected to the processors.

FIG. 2B shows another embodiment of the invention. Here, a clustered shared cache is realized which consists of several second level cache chips (211). Each of these cache chips is connected via a processor bus to each of the processors (210) of its cluster. Memory busses (212) provide a link between said second level cache chips and a common memory (213). In order to allow for the transmission of I/O traffic via the processor bus, I/O adapters (214) are attached to some of the processors (210). Again, the use of the invention permits to omit the switching means that were necessary in prior art solutions.

Figure 2C:
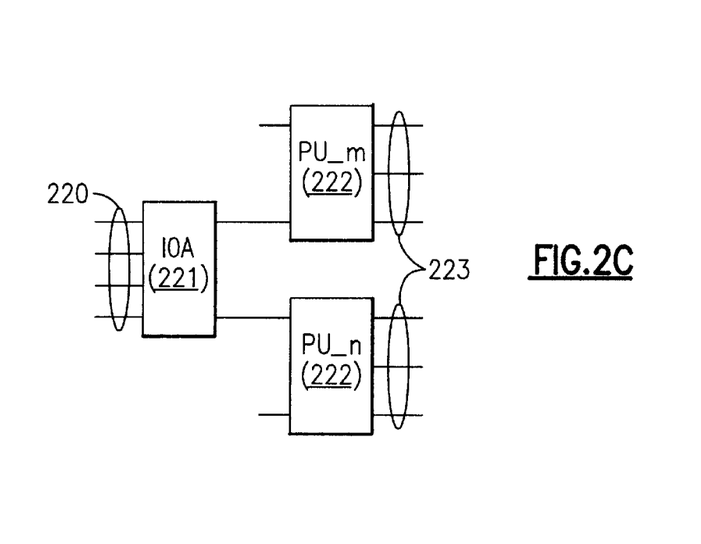
FIG. 2C is a block diagram that shows how one I/O adapter can be attached to several processor.

In FIG. 2C, an I/O adapter (221) is attached to several of the processors (222). I/O traffic from the peripheric devices is transmitted via several busses (220) to the I/O adapter (221). The I/O traffic is then transmitted via several processor busses (223) to the second level cache. Thus, the amount of I/O traffic transmitted via each of the attached processor busses can be dynamically adjusted according to the amount of regular data traffic on that bus. A more efficient use of the processor bus ressources and a dynamic load balancing is achieved.

Figure 3A:
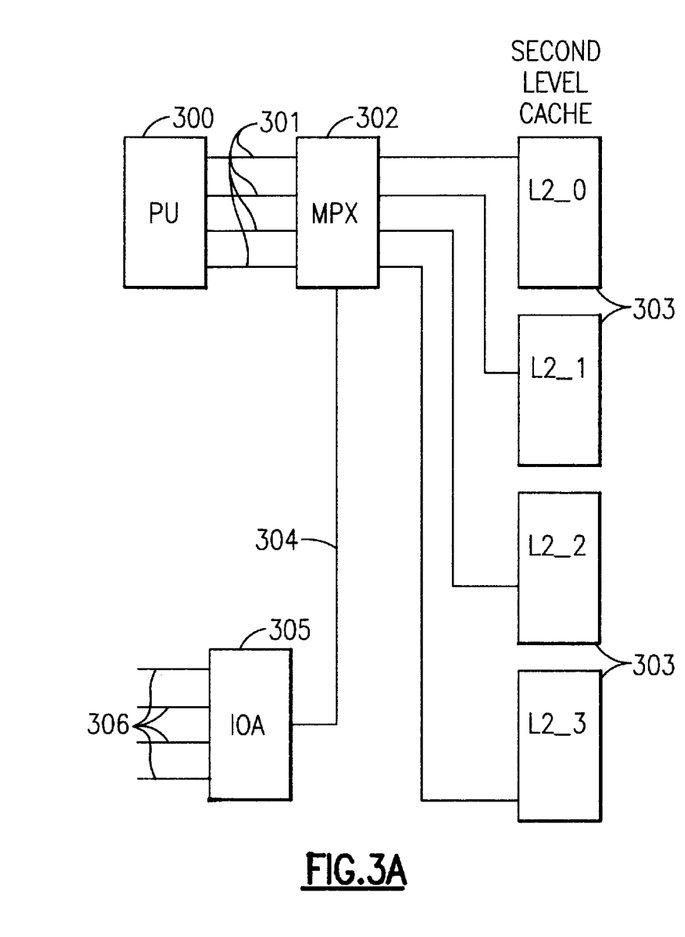
FIG. 3A is a block diagram that shows how I/O traffic can be connected to the processor bus via switching means.

Instead of connecting the I/O adapters to the processors, in order to use the processor busses for transmission of I/O data to the second level cache, one can also introduce multiplexing means to the processor bus. FIG. 3 shows such a solution. A processor (300) is connected via processor busses (301) and via said multiplexing means (302) to several second level cache chips (303). A data link (304) connects said multiplexing means (302) to an I/O adapter (305), with busses (306) connecting peripheric devices to said I/O adapter. Said multiplexing means further comprise arbitration logic which permits access to the processor bus for either the processor (300) or the I/O adapter (305). The transmission of both I/O traffic and regular processor-cache traffic via a processor bus used in multiplex operation permits to save valuable pins of the second level cache chips.

Figure 3B:
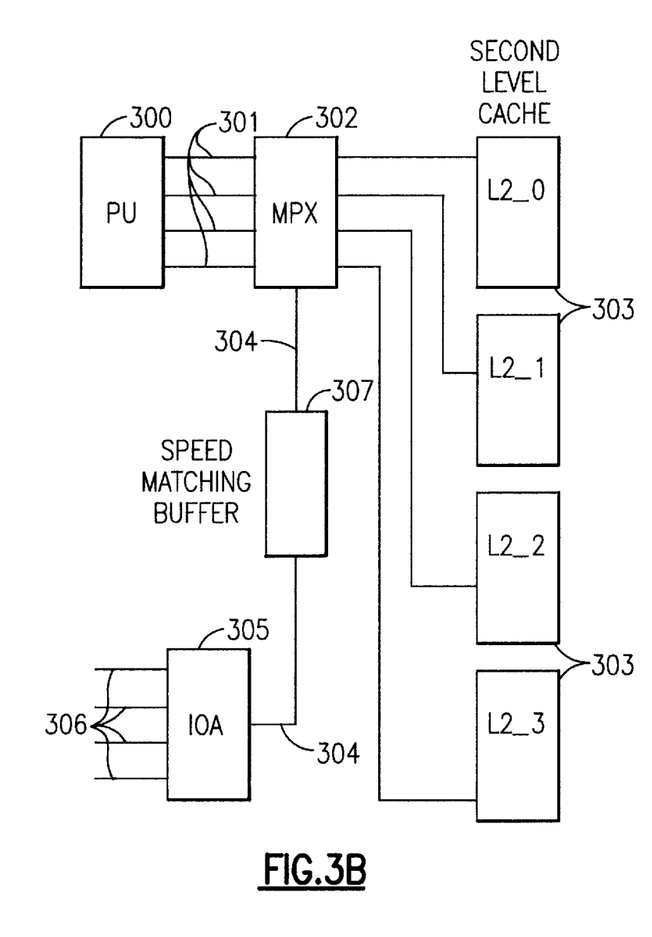
FIG. 3B is a block diagram that shows how a speed matching buffer can be introduced to the setup of FIG. 3A.

The rate at which incoming I/O data arrives at the I/O adapter, and the rate at which I/O data transmission via the processor bus is possible, may differ. FIG. 3B suggests a solution to this problem. A speed matching buffer (307) is included in the data link (304) between I/O adapter (305) and multiplexer (302). Said speed matching buffer (307) provides storage space where incoming data can be buffered before it is transmitted via the processor bus.

Figure 4:
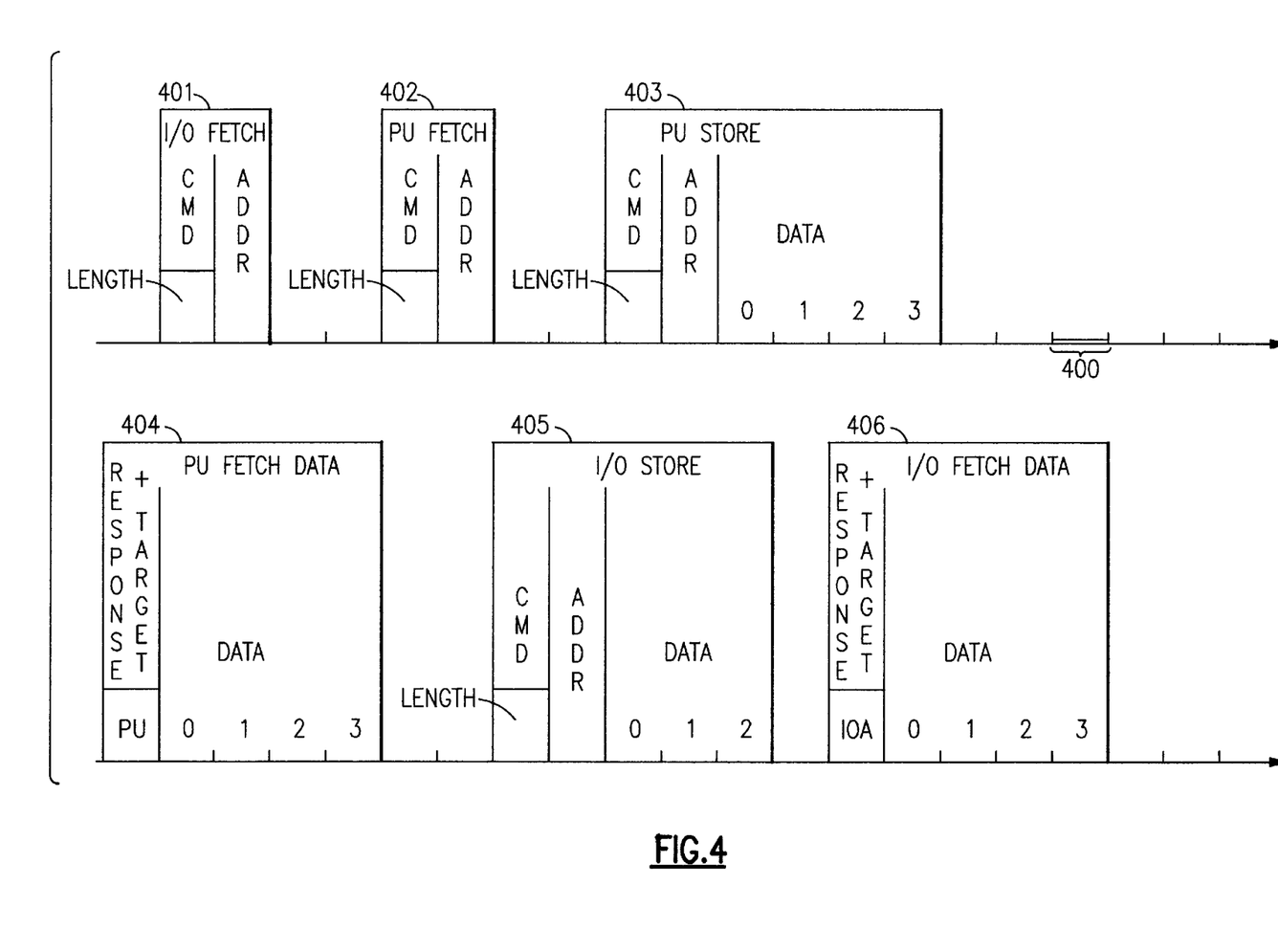
FIG. 4 is a scheme depicting the structure of commands on the processor bus.

In FIG. 4, the structure of instructions and data transmitted via the processor bus is shown in order to demonstrate how regular processor-cache traffic and I/O traffic can be interleaved. The activity on the processor bus is shown as a function of time, with one segment (400) representing one cycle of the processor.

In case a processor wants to perform a read access to the memory, a "PU Fetch" instruction (402) is issued. In a first cycle, the command itself and the length of the data line to be fetched are transmitted, and in a second cycle, the start address of the read operation is given.

"PU Fetch Data" (404) is the response to said "PU Fetch" (402). In its first cycle, the response field specifying the type of the response, its target and status is transmitted together with an identification of the processor that has issued the corresponding "PU Fetch". The data requested by this processor is then transmitted in the following cycles.

When a processor has to perform a write operation to the memory, a "PU Store" command (403) is issued, with the command and the length of the data line transmitted in a first cycle, with the memory address where the data has to be written to specified in a second cycle, and with the data itself transmitted in the following cycles.

In case a processor wants to access I/O data, the I/O data has to be transferred to the memory, and then the processor has to access the memory by issuing "PU Fetch" and "PU Store". Data transfer between the I/O device and main memory is done with the commands "I/O Fetch" (401) and "I/O Store" (405). "I/O Fetch" (401) is transmitted from the I/O device via the I/O adapter to the processor bus, in order to fetch data from the memory. While the command and the length of the data line are transmitted in the first cycle, the start address of the read access is given in the second cycle.

"I/O Fetch Data" (406) is the response corresponding to said "I/O Fetch" command (401). In its first cycle, the response field specifying the type of the response, its target and status is transmitted together with an identification of the I/O adapter that has issued the "I/O Fetch". The data requested by this I/O adapter is then transmitted from the memory to the I/O device in the following cycles.

An "I/O Store" command (405) is initiated by an I/O device in order to write I/O data to the memory. Again, the command specification including the length of the data line to follow is transmitted in a first cycle, the memory address that specifies where the data has to be written to is given in a second cycle, and the following cycles contain the data itself.

Obviously, there is a lot of similarity between the commands that control data exchange between processor and main memory, and those that are responsible for data exchange between I/O devices and main memory. One group of commands does not obstruct the other group of commands. Therefore, no problems arise when commands of both groups are transmitted via the processor bus.

Figure 5:
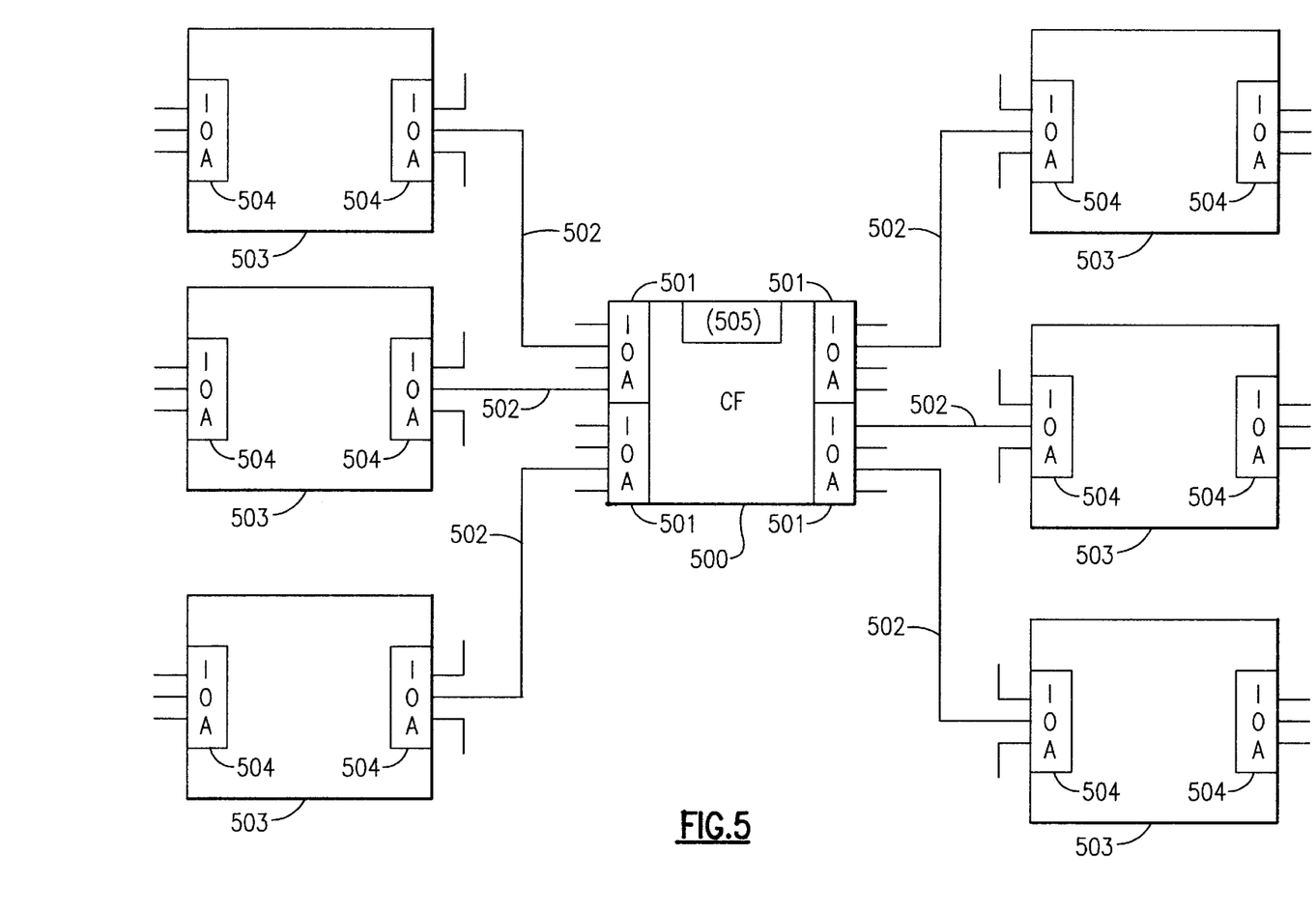
FIG. 5 is a block diagram that shows the basic setup of a computer system comprising several multiprocessor computer systems and a central coupling facility.

Especially when several multiprocessor computer systems are coupled in order to constitute one big system, an implementation of the invention is advantageous. FIG. 5 shows such a system consisting of several connected multiprocessor systems that form a cluster. A central multiprocessor system, the coupling facility (500), is responsible for the management of data flow between the attached multiprocessor computer systems (503), for the management of its rather large central memory (505) which each of the external systems can access, and especially for the management of the external systems' access rights to the data structures stored in said central memory. While shared data structures are contained in the coupling facility's central memory (505), each multiprocessor system still owns its own memory which it can access. Each of the external multiprocessor systems possesses several I/O adapters (504) in order to handle data traffic with I/O devices. The I/O adapters (501) of the coupling facility fulfill a different task: all the data traffic between different multiprocessor systems connected via data links (502) to the coupling facility, and all the data traffic between an external multiprocessor system (503) and the coupling facility's central memory (505), has to take place via said I/O adapters (501). This is the reason why the amount of external data traffic a coupling facility has to handle exceeds by far the amount of I/O traffic arising in a typical multiprocessor computer system. The question is how to couple this big amount of external data to the coupling facility, which is basically a regular multiprocessor system. In prior art solutions, switches were used for this purpose, with all the problems that are implied with the use of switches. For future coupling facilities, because of the requirement of a high transmission rate, these solutions might not even be possible any more.

Figure 6:
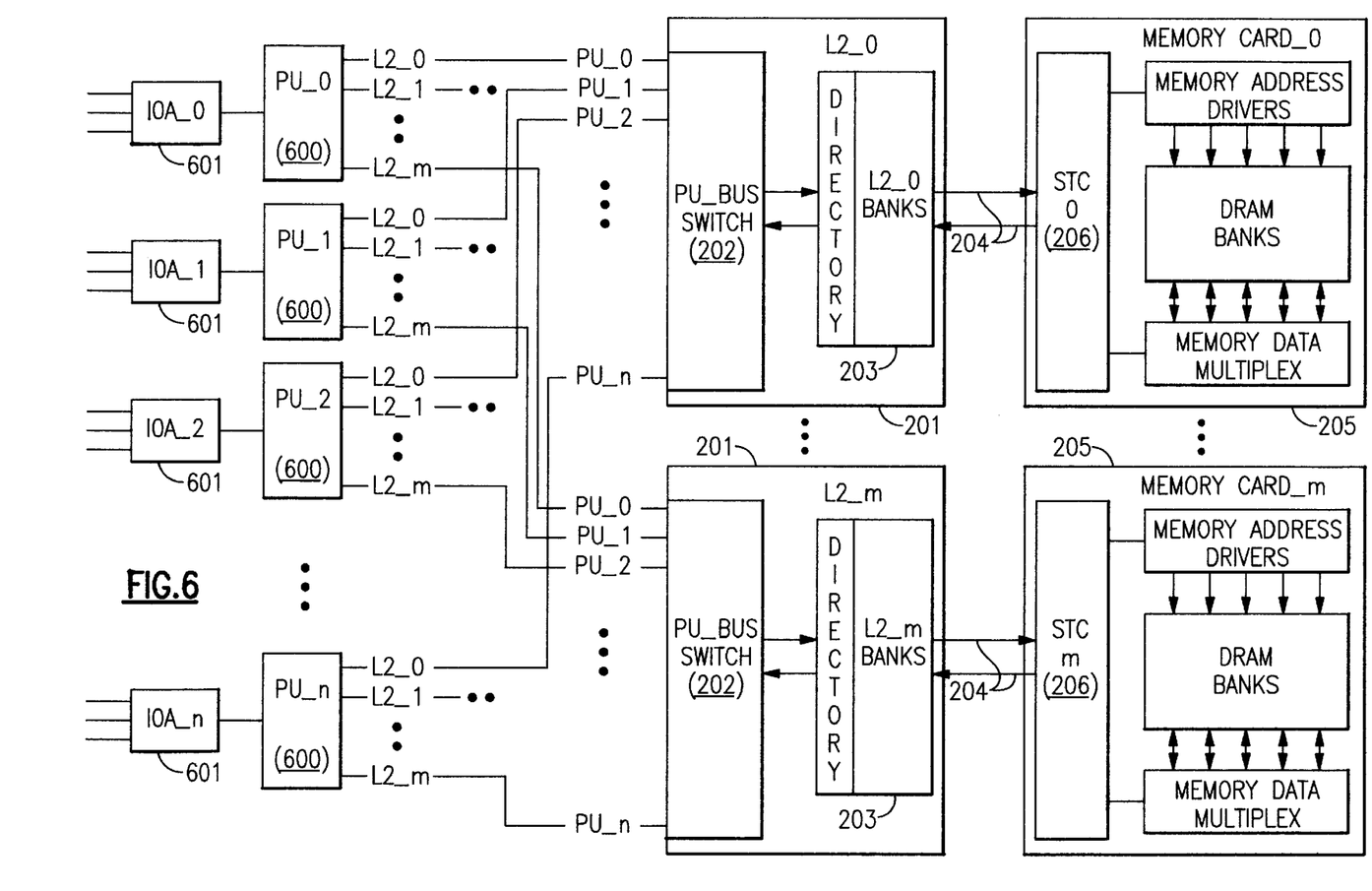
FIG. 6 is a block diagramm that shows a multiprocessor computer system that is to be used as a coupling facility, with the I/O adapters attached to the processors.

FIG. 6 shows how the multiprocessor computer system of FIG. 2A can be modified in order to build a high-performance coupling facility. In order to do so, I/O adapters (601) are not only attached to some, but to each of the processors (600), thus providing the bandwidth necessary for accomodating the required intersystem communication links. Because external traffic is, according to the invention, transmitted to the second level cache via the processor bus, no extra pins of the second level cache are used. Therefore, it is possible to realize a shared second level cache concept and thus combine the advantages of a shared cache with the availability of efficient intersystem communication links. An implementation of the invention thus permits concepts for future high-performance coupling facilities which would not be possible with switching means.

I claim:

1. A computer system, comprising processing means (200);

cache storage means (201); processor bus means for transmitting information between said processing means (200) and said cache storage means (201); and control means (207) for controlling input/output (I/O) traffic between said computer system and external devices;

transmission means for transmitting I/O traffic to and from said cache storage means (201) via said processor bus means; and characterized in that said control means (207) are connected to said processing means (200), with I/O traffic being transmitted to and from said processor bus means via said processing means (200).

2. A computer system comprising processing means (200);

cache storage means (201); processor bus means for transmitting information between said processing means (200) and said cache storage means (201); and control means (207) for controlling input/output (I/O) traffic between said computer system and external devices;

transmission means for transmitting I/O traffic to and from said cache storage means (201) via said processor bus means; and characterized in that said control means (305) are connected to said processor bus means (301) by switching means (302), in a way that either said processing means (300) or said control means (305) are connected to said processor bus means (301) via said switching means (302).

3. A computer system, comprising processing means (200);

cache storage means (201); processor bus means for transmitting information between said processing means (200) and said cache storage means (201); and control means (207) for controlling input/output (I/O) traffic between said computer system and external devices;

transmission means for transmitting I/O traffic to and from said cache storage means (201) via said processor bus means; and characterized in that said processor bus means are realized in tri-state logic comprising a high impedance state, and that said control means are connected to said processor bus means.

4. A computer system according to claim 1, characterized in that said control means (305) further comprise a first-in-first-out buffer (304) in order to match the transmission speed of I/O data transfer between said control means (305) and said processor bus means (301).

5. A computer system, comprising processing means (200);

cache storage means (201); processor bus means for transmitting information between said processing means (200) and said cache storage means (201); and control means (207) for controlling input/output (I/O) traffic between said computer system and external devices;

transmission means for transmitting I/O traffic to and from said cache storage means (201) via said processor bus means; and characterized in that said processing means (200) comprise several processors, and that said cache storage means (201) are implemented as shared cache storage means, with said processors sharing said shared cache storage means in a way that data units contained in said shared cache storage means are accessible to each of said processors.

6. A computer system, comprising processing means (200);

cache storage means (201); processor bus means for transmitting information between said processing means (200) and said cache storage means (201); and control means (207) for controlling input/output (I/O) traffic between said computer system and external devices;

transmission means for transmitting I/O traffic to and from said cache storage means (201) via said processor bus means; and characterized in that said processing means (210) comprise several processors arranged in processor clusters, and that said cache storage means (211) comprise several cache storages arranged in cache storage clusters, with the processors of a processor cluster sharing the cache storages of a cache storage cluster in a way that data units contained in said cache storage cluster are accessible to each of the processors of said processor cluster.

7. A computer system complex comprising at least two computer systems (503, 500), with one of said computer systems being a central computer system (500), and with each of said computer systems (503, 500) comprising processing means (600);

cache storage means (201);

processor bus means for transmitting information between said processing means (600) and said cache storage means (201);

control means (601) for controlling intersystem information traffic to and from said computer system (503, 500);

being characterized in that said computer system complex further comprises intersystem information links (502), with said intersystem information links (502) connecting the control means (504) of each of said computer systems (503) with the control means (501) of said central computer system (500), with intersystem information traffic between said computer systems (503) and said central computer system (500) being transmitted via said intersystem information links (502); and at least one of said computer systems (503, 500) further comprises transmission means for transmitting said intersystem information traffic between the control means (601) and the cache storage means (201) of said computer system via the processor bus means of said computer system.

8. A computer system complex according to claim 7, characterized in that said computer system complex further comprises central memory means (505) attached to said central computer system (500), with data units stored in said central memory means (505) being accessible to said other computer systems (503) via said intersystem information links (502).

\* \* \* \* \*